Aug. 1, 1933.   M. G. KURTH   1,920,470
PISTON, PACKING, AND THE LIKE
Filed July 8, 1931
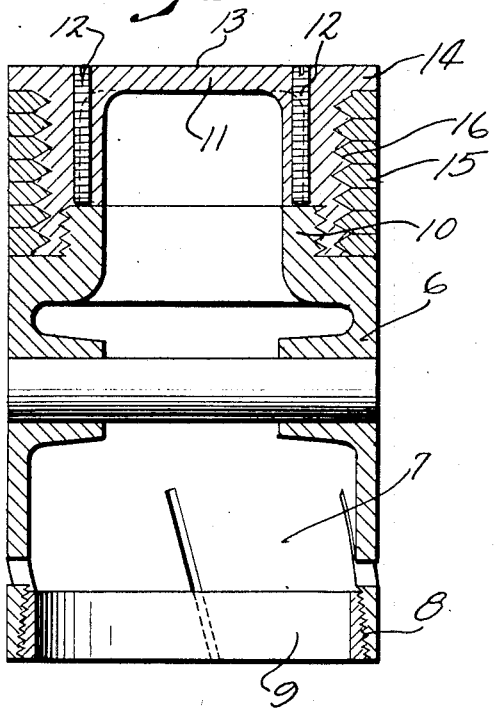
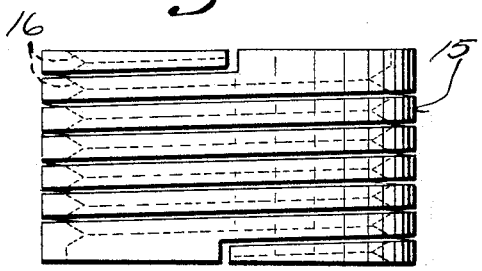
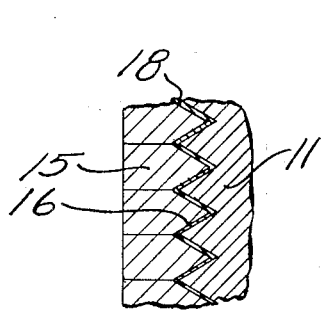
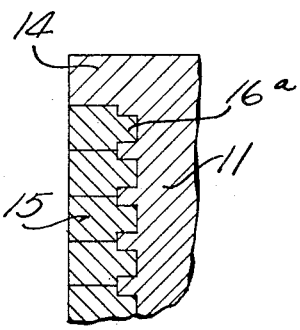
INVENTOR
Matthew G. Kurth
BY
Wheeler, Wheeler & Wheeler
ATTORNEYS Patented Aug. 1, 1933

1,920,470

UNITED STATES PATENT OFFICE 1,920,470

PISTON, PACKING, AND THE LIKE

Matthew G. Kurth, Madison, Wis.

Application July 8, 1931. Serial No. 549,358

7 Claims. (Cl. 309—30)

This invention relates to improvements in pistons, packing and the like, the present application being a companion to my co-pending application, Serial No. 529,633, filed April 13, 1931.

It is the object of the invention to provide a novel and improved packing means by which the effective diameter of a piston or piston rod may be increased to compensate for piston or cylinder wear, the packing being made up of a helix having a number of coils encircling the piston, each coil being independently positioned thereon.

I have found that in the use of helical packing any slight clearance between successive coils has a cumulative effect throughout the length of the packing and produces a slight noise in the course of piston operation. The cumulative effect is eliminated if the successive turns of the helix are individually positioned with reference to the piston as herein disclosed.

In the drawing:

Figure 1 is a vertical axial section through a piston embodying the invention.

Figure 2 is a side elevation of the packing used in said piston.

Figure 3 is a fragmentary detail shown in a section similar to Fig. 1 and illustrating the expansion of the packing through the use of a specially designed helically threaded insert or shim.

Figure 4 is a fragmentary detail of a piston and packing assembly showing the parts in cross section and illustrating a modified embodiment of the invention.

Like parts are identified by the same reference characters throughout the several views.

By way of illustrating the invention I have shown a piston expansible at both ends so far as its effective diameter is concerned. The body portion 6 of the piston corresponds to general practice, but its skirt 7 is slotted and provided with an internal tapering thread at 8 with which a tapering threaded annular plug 9 interacts to expand the skirt as disclosed in the companion application above identified.

The body portion 6 is provided centrally at its outer end with an externally threaded boss 10 upon which is screwed a piston head member 11 provided with locking screws 12. The face portion 13 of the piston is formed at the end of head member 11 and extends across a radial flange 14 thereof, which is practically flush with the face of the helical packing member 15. The provision of a separate head member 11 serves to confine the packing 15 against axial displacement with reference to the piston.

The periphery of the head member 11 is provided, in accordance with this invention, with a helical thread 16 to which the inner periphery of the helical packing 15 is complementary. This thread is preferably V-shaped in cross section, as shown in Figs. 1, 2 and 3, but it may be a screw thread as shown at 16a in Fig. 4. Regardless of whether the thread is angular or square, the cross section of the packing preferably corresponds to that of the thread so that the two fit together in complementary manner as shown.

When it is desired to expand the working end of the piston a shim is used as shown in Fig. 3, wherein the shim is designated by reference character 18. It corresponds identically with the groove or thread into which the packing is fitted, so that its only effect is to force outwardly for the thickness of the shim the outer peripheral portions of the packing, thus increasing the radius of the piston by the thickness of the shim.

It will be apparent to those skilled in the art that each coil of the helical packing member 15 is independently positioned with reference to the piston by means of this invention, and thus any axial clearance between successive coils of the helix and the complementary portions of the piston will have solely a local effect and there will be no cumulative effect.

I claim:

1. The combination with a member to be packed having a helical groove of V-shaped cross section, of a helical packing member having its internal periphery formed to correspond in cross section to said groove and operatively engaged therein, the walls of said groove being fixed and the sides of the convolutions of the packing member normally contacting.

2. The combination with a member requiring packing provided with a helical groove of rectangular cross section, of a helical packing element applied to said member and having portions complementary in cross section to said groove engaged therein, whereby to position individual coils of said element against axial displacement at any point with reference to said member, said grooves having an axial extent less than that of the individual coil of said element, and said element having a correspondingly reduced tongue engaged in said groove.

3. As a new article of manufacture, a packing member comprising a helix having a relatively wide external peripheral face, and an internal peripheral portion reduced in thickness and receivable into a groove too narrow to receive the full width of the helix.

4. The combination with a member requiring packing and provided with a helical groove, of a helical packing element applied to said groove and having an exposed outer peripheral surface exceeding the root of said groove in width, and a portion of said element of reduced cross section threaded to said groove.

5. The combination with a member requiring packing provided with a helical groove and a packing element having a portion complementary to said groove and threaded therein, of an interposed complementary helical shim fitted between said packing member and groove and spacing said packing elements from said member.

6. The combination with a member requiring packing and provided with a helical groove having inwardly converging side wall portions fixed with reference to said member, of a helical packing having an inner portion complementary to said groove and outer abutting portions terminating in an exposed cylindrical surface.

7. The combination with a member requiring packing and having a helical groove with side wall portions fixed with reference to said member, of a helical packing including successive convolutions having complementary side wall portions on its inner periphery threaded to said groove, said successive convolutions of the packing adapted to be forced together into substantially gas-tight relation to each other.

MATTHEW G. KURTH.